United States Patent [19]

Birchall et al.

[11] Patent Number: 5,063,107

[45] Date of Patent: Nov. 5, 1991

[54] SILICON CARBIDE FIBRE AND PRODUCTION THEREOF

[75] Inventors: James D. Birchall, Mouldsworth; William J. Clegg, Upton, both of England

[73] Assignee: Imperial Chemical Industries PLC, London, England

[21] Appl. No.: 418,262

[22] Filed: Oct. 6, 1989

[30] Foreign Application Priority Data

Oct. 6, 1988 [GB] United Kingdom ............... 8823472

[51] Int. Cl.$^5$ .............................................. D02G 3/00
[52] U.S. Cl. .................................... 428/367; 428/364; 428/401; 501/95
[58] Field of Search ...................... 428/367, 364, 401; 501/92, 95; 106/55

[56] References Cited

U.S. PATENT DOCUMENTS

| | | | |
|---|---|---|---|
| 3,892,583 | 7/1975 | Winter et al. | 106/55 |
| 4,315,968 | 2/1982 | Suplinskas et al. | 428/367 |
| 4,340,636 | 7/1982 | DeBolt et al. | 428/215 |
| 4,628,002 | 12/1986 | Suplinskas et al. | 428/367 |
| 4,657,991 | 4/1987 | Takamizawa et al. | 525/477 |
| 4,898,778 | 2/1990 | Loszewski | 428/367 |

FOREIGN PATENT DOCUMENTS 0239301 9/1987 European Pat. Off. .

*Primary Examiner*—Lorraine T. Kendell
*Attorney, Agent, or Firm*—Cushman, Darby & Cushman

[57] ABSTRACT

A silicon carbide fibre, which may have a mean crystallite size of greater than 500Å, in which the silicon carbide constitutes greater than 90% by weight of the fibre, and in which the fibre is substantially homogeneous across a transverse section of the fibre. The fibre may be produced by a process which comprises forming a fibre from a homogeneous mixture comprising particulate silicon carbide dispersed in a solution of an organic polymeric material in a liquid medium, and heating the fibre at elevated temperature in order to decompose the organic polymeric material and to sinter the particles of silicon carbide.

9 Claims, No Drawings

SILICON CARBIDE FIBRE AND PRODUCTION THEREOF

This invention relates to silicon carbide fibres and to a process for the production of the fibres.

Fibres of silicon carbide have in recent years been used in an increasing variety of applications. Such fibres have high heat resistance and they may have high tensile strength and substantial flexibility. The fibres may be used as such or they may be woven into the form of a fabric before use. Applications of silicon carbide fibres which have been proposed include many reinforcement applications, such as in the reinforcement of monolithic silicon carbide structures and of structures made of other refractory materials in order to produce structures of high strength and high fracture toughness, particularly at elevated temperatures. Silicon carbide fibres have also been proposed for use in the reinforcement of metallic structures. Silicon carbide fibres may also be used to reinforce organic plastics materials, although in this application the high heat resistance properties of the fibres are not as relevant as in those applications in which metallic and refractory materials are reinforced.

Various processes have been proposed for the production of silicon carbide fibres.

Silicon carbide fibres have been produced by thermal decomposition of organisilicon polymer precursors in fibrous form. Thus, a solution of an organosilicon polymer, a polycarbosilane, may be spun into the form of a fibre and the fibre heated in an inert atmosphere to remove the solvent from the fibre, and the fibre may be heated at an even higher temperature in order to pyrolyse the organosilicon polymer and produce silicon carbide in fibrous form. Organosilicon polymers which have been proposed for use as precursors include those obtained from dodecamethlcyclohexasilane formed by dechlorination of $CH_3SiCl_3$ with lithium (Yajima et al Chemical Letters 1975 pp 931 to 934 and 551 to 554), and from polydimethylsilane by dechlorination with sodium (Chem. Abst. 89, 130854).

Silicon carbide fibres may also be produced from fibres of carbon. For example, in GB Patent 998089 there is described a process for the production of fibres of the carbides of silicon, tantalum, molybdenum or tungsten which comprises forming a cloth or group of fibres of carbon and converting the cloth or group of fibres in situ to fibres of the carbide by heating the cloth or group of fibres in an inert atmosphere or in vacuum in the presence of the chosen metal. For example, a carbon cloth may be embedded in silicon powder and heated to a temperature just below the melting point of silicon.

Silicon carbide fibres may also be produced by a chemical vapour deposition process in which a heated core in the form of a fibre, e.g. a carbon fibre or a tungsten wire, is drawn through a deposition chamber into which a vaporised silicon containing reactant is introduced and in which the reactant is decomposed leading to deposition of silicon carbide onto the fibrous core. The fibre which is produced has a composite structure and does not consist entirely, or even substantially of silicon carbide. For example, U.S. Pat. No. 3433725 describes such a process in which the reactant is silicon tetrachloride which decomposes and reacts with carbon in fibrous form to produce a composite fibre having a sheath of silicon carbide and a core of carbon.

Yet a further process which has been proposed for the production of silicon carbide fibres is to heat a viscose rayon fibre with silicon, e.g. with silicon in the form of colloidal silica, at elevated temperature (Chem Abst 102, 97733).

Silicon carbide fibres made by the aforementioned processes suffer from a disadvantage in that, although monolithic sintered silicon carbide structures may be able to withstand prolonged exposure to elevated temperatures of the order of 1500° C. with little or no loss in strength of the structures, silicon carbide fibres produced by many of the processes which have been described hitherto suffer a substantial loss in strength on exposure to such an elevated temperature, and even on exposure to lower temperatures of the order of 1000° C., with the result that at such elevated temperatures there is a corresponding decrease in the reinforcing effect produced by the silicon carbide fibres in the matrix in which the fibres are incorporated. This instability and loss of strength of silicon carbide fibres may occur not only when the fibres are heated in an oxygen-containing atmosphere, e.g. in air, at such elevated temperatures but also when the fibres are heated to such temperatures in an inert atmosphere.

The adverse effect of elevated temperatures on the strength of silicon carbide fibres is well documented. For example, in Proc. Conf. on Advances in Composite Materials, (ICCM-III) Paris, 1980, 2 page 17 it is reported that SiC yarn fibres suffer significant losses in room temperature strength after heating at or above 1200° C. and that commercial fibres exhibit a drop in strength when heated above about 1000° C. In Ceram. Eng. Sci. Prog. 7 pages 901 to 903, 1986 it is reported that 'Nicalon' silicon carbide fibres produced by pyrolysis of an organosilicon polymer in fibrous form suffer significant losses in mechanical properties when the fibres are contacted with hot gaseous environments or hot liquids, and in Ceram. Eng. Sci. Prog. 7 pages 914 to 930, 1986 it is reported that 'Nicalon' silicon carbide fibres suffer a major loss in tensile strength when heated in argon at 1400° C. Silicon carbide fibres produced by chemical vapour deposition onto a suitable fibrous core also suffer a loss in strength when heated to elevated temperatures. Thus, Proc. Int. Conf. on SiC, Miami, Univ. of South Carolina Press, ed. R. C. Marshall, 1973, pages 386 to 393 reports that silicon carbide fibres produced by thermal decomposition of methyltrichlorosilane on a tungsten core suffered substantial loss in rupture strength even when heated to a temperature as low as 1000° C., and a very substantial loss when heated to a temperature above 1200° C., and a similar loss in strength of a silicon carbide fibre produced by chemical vapour deposition on a carbon core was reported in J Composite Materials, 9 1975 pages 73 to 76.

It is believed, without prejudice, that this instability and loss of strength of silicon carbide fibres at elevated temperatures is associated with the composition of the fibres. For example, fibres which comprise a sheath of silicon carbide on a core of a different material, e.g. of carbon or of tungsten, are believed to suffer a loss of strength at elevated temperatures as a result of reaction between the silicon carbide sheath and the material of the core. Fibres produced by decomposition of a polymer precursor in fibrous form may comprise unreacted silica or unreacted carbon the presence of which may lead to reaction and to a decrease in the strength of the fibre at elevated temperatures. The excess of silica or carbon which may be present in such a fibre may also react at elevated temperatures with the matrix in which the silicon carbide fibre is incorporated with possible deleterious consequences.

The present invention relates to silicon carbide fibres, and to a process for the production of the fibres, the fibres when heated at elevated temperature eg to a temperature of the order of 1200° C. to 1500° C., suffering a loss in strength, if any, which is not as great as that suffered by silicon carbide fibres produced by processes which have generally been described hitherto.

Furthermore, the silicon carbide fibres of the present invention have a microstructural stability when heated to elevated temperatures which is superior to that of silicon carbide fibres produced hitherto.

According to the present invention there is provided a process for the production of a silicon carbide fibre which comprises forming a fibre from a homogeneous mixture comprising particulate silicon carbide dispersed in a solution of an organic polymeric material in a liquid medium, and heating the fibre at elevated temperature in order to decompose the organic polymeric material and to sinter the particles of silicon carbide.

The silicon carbide fibre produced by the aforementioned process has a structure which is distinguished from that of fibres described hitherto, and in a further embodiment of the invention there is provided a fibre of silicon carbide in which the silicon carbide constitutes greater than 90% by weight of the fibre and in which the fibre is substantially homogeneous across a transverse section of the fibre.

The silicon carbide fibre of the invention of substantially homogeneous across a transverse section of the fibre, that is it has a substantially uniform composition across this transverse section, unlike silicon carbide fibres which comprise a sheath of silicon carbide on a core of a different mterial which clearly are not homogeneous across a transverse section of the fibre. Furthermore, as silicon carbide fibres produced by pyrolysis of a polymer precursor therefor generally contain substantial proportions of oxygen, present as silica, and possibly of carbon, these latter fibres generally comprise less than 90% by weight of silicon carbide and also are not homogenous, and are thus distinguished from the fibres of the present invention.

It is to be understood that the present invention does not exclude silicon carbide fibres which are substantially homogeneous across a transverse section of the fibre but which have a surface layer of a material other than silicon carbide which may be present in order to modify the interfacial strength between the fibre and a susbtrate in which the fibre is incorporated. The silicon carbide fibre of the invention has a high degree of crystallinity and is polycrystalline, and the invention also provides a silicon carbide fibre which is polycrystalline, by which we mean that the fibre comprises a plurality of separate crystallites of mean size greater than 500A, as measured by X-ray diffraction. This is in contrast to the known silicon carbide whiskers which, although they have a high degree of crystallinity, comprise a single crystal of silicon carbide in fibrous form. Such whiskers, which can be produced by growing a single crystal, have somewhat limited dimensions when compared with fibres which can be made by the process of the present invention.

In contrast to the crystalline nature of the fibres of the invention the fibres produced by thermal decomposition of precursors in fibrous form and by chemical vapour deposition tend to comprise substantial proportions of amorphous or partially crystalline material and to have a small mean crystallite size. The highly crystalline nature of the fibre of the invention provides an additional benefit in that, in contrast to such known fibres, there is little change in crystallinity of the fibre on heating to elevated temperatures and little change in the size of the crystallites of silicon carbide in the fibres, and thus little if any phase change on heating to elevated temperatures. The fibres of the invention may thus be defined in yet a further way. Thus, the silicon carbide fibres of the invention, when heated at an elevated temperature of 1500° C. or greater for a prolonged period of time, eg for 10 hours or more, show little or no increase in crystallinity or change in mean crystallite size.

The fibre of the invention which is defined as being polycrystalline and as having a mean crystallite size of greater than 500A, as measured by X-ray diffraction, is itself not necessarily substantially homogeneous over a transverse section of the fibre, although it preferably is substantially homogeneous. Thus, the silicon carbide fibre which is polycrystalline and has a mean crystallite size of greater than 500A may comprise a sheath of silicon carbide on a core of another material, preferably a material which is resistant to degradation at elevated temperatures and which does not react with the silicon carbide at elevated temperatures. Such a fibre may be produced by depositing onto a core of another material a sheath of a homogeneous mixture comprising particulate silicon carbide dispersed in an aqueous solution of an organic polymeric material in a liquid medium, and heating the fibre at elevated temperature in order to decompose the organic polymeric material and to sinter the particles of silicon carbide.

The fibre production process of the invention is effected with silicon carbide in particulate form which, in contrast to known production processes, is formed before the stage at which the fibre itself is produced. Thus, in the process it is possible to effect the fibre production process with relatively pure uncontaminated silicon carbide with the result that the disadvantages of fibres containing smaller or larger amounts of impurities, eg silica and/or carbon, and produced by known processes in which a precursor in fibrous form is chemically decomposed, are overcome.

In order to produce relatively pure silicon carbide for conversion to fibrous forms the method by which the silicon carbide particles are produced is clearly of some importance. Several methods are known by which particulate silicon carbide may be produced. For example, particles of silicon carbide have traditionally been produced by the so-called carbothermic reaction in which an intimate mixture of carbon and silica is heated in an inert atmosphere to produce the carbide according to the equation

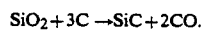

$$SiO_2 + 3C \rightarrow SiC + 2CO.$$

However, although in the process the required stoichiometric proportion of silica to carbon may readily be achieved, that is, three moles of carbon for every mole of silica, it may be difficult to achieve the necessary intimate contact between the carbon and the silica in order that a product of uniform composition may be produced, that is a uniform composition on a molecular scale. In particular, the particles which are produced, which are nominally silicon carbide, may be contaminated with unreacted silica and/or carbon. This may be the case even when very small particles of silica and carbon are used, for example silica sol and carbon black. Furthermore, in this traditional process it may also be difficult to produce particle of silicon carbide having a very small size, e.g. a size of less than 1 micron.

In an alternative process particles of silicon carbide may be produced by pyrolysis of rice hulls, as described in Thermochimica Acta, 81, (1984) 77–86.

Rice hulls consist of silica and cellulose, which yields a mixture of silica and carbon when thermally decomposed. Rice hulls have a very high surface area and this, together with the intimate contact between the carbon and silica in the thermally decomposed rice hulls, enables silicon carbide to be formed by subsequent pyrolysis at relatively low temperatures. However, the molar ratio of silica to carbon in the thermally decomposed rice hulls is generally about 1 to 4.7, that is there is a substantial excess of carbon over the stoichiometrically required proportion of 1:3.

A preferred process for the production of particles of silicon carbide which are of high purity, which contain little if any unreacted silica and/or carbon, and which are particularly suitable for use in the production of the silicon carbide fibres of the present invention are those produced by the process of European Patent Application 0 239 301A in which there is described a process for the production of a silicon carbide which comprises producing an oxygen-containing polymeric product by reacting a first reactant which comprises at least one compound of silicon having two or more groups reactive with hydroxyl groups with a second reactant which comprises at least one organic compound have two or more hydroxyl groups, heating the polymeric product in an inert atmosphere to produce a coked product containing carbon and silica, and heating the coked product to effect a carbothermic reaction between the silica and the carbon, in which the proportion of the first and second reactants is chosen such that in the coked product the proportion by weight of carbon to the silica is close to the proportion which is theoretically required to produce the silicon carbide.

The disclosure of the aforementioned European Patent Application is incorporated herein by reference.

The particles of silicon carbide in the composition from which the fibres of the invention are produced may be of substantially the same particle size or they may comprise a plurality of particle sizes. Indeed the latter is preferred as the use of a plurality of particle sizes assists in the production of a high density silicon carbide fibre. The sizes of the particles of silicon carbide will be determined at least to some extent by the diameter of the fibre which is to be produced in the process of the invention as the maximum dimension of the particles should be less than, and preferably substantially less than, the diameter of the fibre which is to be produced. It is preferred that the maximum dimension of the particles of silicon carbide is not greater than 50 microns, more preferably not greater than 10 microns, although it is of course possible for particles having a maximum dimension greater than 50, or 10 microns to be used in the process. In general, the maximum dimensions of the particles will be in the range 0.1 to 5 microns. For reasons which have been explained previously the particles of silicon carbide should be of high purity, and it is preferred that the particles of silicon carbide used in the process of the invention should comprise at least 90% by weight of silicon carbide. In order to produce fibres of silicon carbide which are of high strength and which retain their high strength on prolonged exposure to elevated temperature it is preferred that the silicon carbide used in the process of the invention comprises at least 95% by weight silicion carbide, and thus that the silicon carbide in the fibre of the invention constitutes at least 95% by weight of the fibre.

The particles of silicon carbide preferably have a low aspect ratio as this aids the fibre production process. A maximum aspect ratio of 2 is preferred. Substantially spherical particles are most preferred.

The composition from which the fibres are produced comprises a solution of an organic polymeric material in a liquid medium. Although it is possible for the liquid medium to be an organic material it is much preferred, for reasons of low toxicity and flammability, that the liquid medium is an aqueous medium. In general the liquid medium will be water.

The composition from which the fibres are produced may comprise any organic polymeric material which is soluble in the liquid medium.

Suitable water-soluble organic polymeric materials include, for example, cellulose derivatives, e.g hydroxy propyl methyl cellulose, polyacrylamide, polyethylene oxide, and polyvinyl pyrollidone. A preferred organic polymeric material, which is particularly suitable for use in production of fibres, is a hydrolysed polymer or copolymer of vinyl ester, particularly a hydrolysed polymer or copolymer of vinyl acetate. The degree of hydrolysis of the polymer or copolymer of vinyl acetate is preferably at least 50%, more preferably in the range 70% to 90%, particularly where the composition is to be processed at or near ambient temperature.

The concentration of the organic polymeric material in the liquid medium will depend on a number of factors, for example, the nature of the organic polymeric material, the size and size distribution of the particulate silicon carbide and its mean apsect ratio, and on the relative proportions by volume of the silicon carbide, of the liquid medium, and of the organic polymeric material. A concentration of organic polymeric material in the liquid medium in the range 5% to 60% by volume will generally suffice.

It is preferred that in the composition from which the fibres are produced the concentration of particulate silicon carbide is reasonably high as the lower is the proportion of silicon carbide the greater is the proportion of organic polymeric material and of liquid medium which must be removed from the fibre in the later stages of the process, although the proportion of silicon carbide particles which is used is dependent in part on the method by which the fibre is produced, as will be discussed hereafter. It is preferred that the proportion of silicon carbide in the composition is as high as possible consistent with the composition retaining its ability to be converted into a fibrous form in the process although the proportion of silicon carbide particles which is used is dependent in part on the method by which the fibre is produced, as will be discussed hereafter. It is thus preferred that the composition comprises at least 50% by volume of particulate silicon carbide. The composition may comprise at least 60% by volume of silicon carbide, or even as much as 70% or more by volume of silicon carbide.

The composition from which the fibre is produced comprises a homogeneous mixture of the components of the composition, that is a composition in which the particles of silicon carbide are homogeneously distributed throughout the composition. The mixing of the components of the composition is preferably effected under conditions of high shear in order to ensure homogeneity in the composition. For example, where the composition is in the form of a highly viscous dough the mixing of the composition may be effected in a screw extruder or on a twin-roll mill the rolls of which may be operated at the same or at different peripheral speeds. The composition may be passed repeatedly through the nip between the rolls of the mill, which nip may be progressively decreased in size. The nip between the rolls of the mill may be decreased to a size as low as 0.1 mm with the result that very high shear may be applied to the composition which assist in breaking down aggregates of particulate silicon carbide which may be present in the composition. On the other hand, where the composition is of relatively low viscosity and has more mobile consistency it may be mixed by rapid stirring with a bladed mixer.

The composition may be converted into a fibre by any suitable spinning process. The spinning process may be, for example, a wet spinning process in which a fibre is formed by extruding the composition through a suitably sized orifice and into a liquid medium which is a non-solvent for the organic polymeric material, or a fibre may be drawn from the composition. Such spinning processes are more suitable for use with compositions containing relatively low proportions of a silicon carbide. Alternatively, the spinning process may be a dry spinning process in which the composition is extruded through a suitably sized orifice and the liquid medium is removed from the fibre by evaporation, eg by heating the fibre to evaporate the liquid medium. Such a spinning process is generally more suitable for use with compositions containing relatively high proportions of silicon carbide. Where the fibre comprises a sheath of silicon carbide on a core of another material the fibre may be produced by co-extrusion of the core and the composition.

The fibre which is produced comprises silicon carbide particles in a matrix of organic polymeric material, and in the next stage of the process of the invention this fibre is heated in order to decompose the organic polymeric material in the fibre. The fibre is heated to an elevated temperature at which the organic polymeric material in the fibre is decomposed. A suitable temperature will depend to some extent on the nature of the organic polymeric material, but in general a temperature of up to 500° C. will suffice. This heating may generally be effected in an oxygen-containing atmosphere, eg in air, as the presence of such an atmosphere assists in the decomposition of the organic polymeric material. Alternatively, the heating may be effected in an inert atmosphere, e.g. in nitrogen or argon, in order to leave a small proportion of carbon in the fibre which aids the sintering of the silicon carbide particles in a subsequent stage of the process.

In a subsequent stage of the process the fibre is further heated in order to sinter the particles of silicon carbide. The temperature which is required in order to effect this sintering will generally be above 1000° C. and may be as high as 1500° C. or even greater, e.g. up to about 2000° C. Sintering may be aided by including in the composition a small proportion of a sintering aid for example a known sintering aid such such as boron or carbon. Sintering at elevated temperature assists in achieving a high degree of crystallinity in the fibre of the invention and a high degree of crystallite size size stability.

The later heating stage of the process of the invention will generally be effected in an inert atomsphere by which we mean in an atmosphere which is unreactive with the silicon carbide at the temperature of heating. A suitable inert atmosphere is that of an inert gas, e.g. helium or argon, or a vacuum. The entire heating stage is not necessarily effected in an atmosphere of an inert gas or in a vacuum. For example, as stated above, in the initial heating stage in which the organic polymeric material is removed from the fibre it is advantageous to effect the heating in an oxygen-containing atmosphere, e.g. in air, as the presence of oxygen assists in decomposition of the organic polymeric material by burning. However, in the later heating stage of the process in which the silicon carbide particles are sintered at a temperature above that at which the organic polymeric material is decomposed, the presence of an atmosphere containing oxygen should be avoided as the oxygen may react with the silicon carbide to produce silica. It may also be necessary to avoid the use of nitrogen as nitrogen may react with the silicon carbide to produce silicon nitride.

The final heating stage in which the particles of silicon carbide in the fibre are sintered may be effected for a time sufficient for the density of the fibres to be increased to a value approaching the maximum density, e.g. to a density of at least 95%. preferably at least 98%, of the density of silicon carbide per se.

The silicon carbide fibres of the invention may have any suitable diameter, and the orifice through which the composition is spun or extruded in the process of the invention, or the speed at which a fibre is drawn, will be chosen to result in the production of a silicon carbide fibre having the desired diameter. The diameter of the silicon carbide fibre may be, for example, less than 500 microns, or less than 100 microns or 50 microns as fibres having such diameters are generally used in the reinforcement applications hereinbefore referred to. The diameter of the silicon carbide fibre may be as low as 1 micron or more usually 10 microns. However, the fibre diameters hereinbefore referred to are merely by way of illustration and are not intended to be limiting.

The invention is illustrated by the following examples in which all parts are expressed in parts by weight.

EXAMPLE 1

A composition of 49.5 parts of silicon carbide powder having a particle size in the range 0.1 micron to 2 microns and comprising >98% by weight of silicon carbide, 0.5 part of boron powder as a sintering aid, 4.5 parts of hydrolysed polyvinyl acetate having a degree of hydrolysis of 80%, and 9 parts of water was mixed on twin-roll mill operating at 22° C. and formed into a band on the mill. The band was removed from and recharged to the mill in order to form a homogeneous mixture of the components in the composition. The composition was then charged to a screw extruder and extruded at a temperature of 22° C. through a 300 micron diameter orifice into air and the resultant fibre was dried by heating in an oven at 80° C. The dried fibre was heated in an oven in an atmosphere of argon at a rate of increase of temperature of 1° C. per minute up to 800° C. and heated at 800° C. for 1 hour in order to decompose the organic polymeric material from the fibre. Analysis of the fibre indicated that it contained about 1% by weight of residual carbon which was useful as a sintering aid. The fibre was then heated for half an hour at 2040° C. in an oven under an argon atmosphere in order to sinter the particles of silicon carbide in the fibre and in order to densify the fibre. The fibre was then allowed to cool in an atmosphere of argon.

Chemical analysis of the silicon carbide fibre indicated a carbon content of 31.6 weight % compared with a theoretical value of 30.4 weight %, allowing for the boron present as a sintering aid. The fibre which was produced thus consisted substantially of silicon carbide, and in particular substantially in excess of 90% by weight of silicon carbide.

Chemical analysis for oxygen, boron and nitrogen indicated that these elements were present in percentages by weight of 0.1% <0.1% and 0.34% respectively.

By way of comparison chemical analysis of a commercially produced silicon carbide fibre produced by thermal decomposition of an organosilicon polymer fibre ('Nicalon', Nippon Carbon Co.) showed that the fibre contained 13.1% by weight of oxygen, corresponding to 24.6% by weight of silica, and chemical analysis of another commercially produced silicon carbide fibre produced by thermal decomposition of a titanocarbosilane polymer fibre ('Tyranno', Ube Industries Ltd) showed that the fibre contained 13.0% by weight of oxygen, corresponding to 24.4% weight of silica.

A sample of the silicon carbide fibre produced as described in this example was mounted in a block of acrylic resin and the block was polished to reveal a flat smooth section through the fibre and transverse to the length of the fibre. The section of the fibre was then examined by energy dispersive X-ray analysis and line scans for Si and C were carried out. No part of the section transverse to the length of the fibre contained an area greater than 5 micron in dimension over which the count of Si X-rays was then half that in the bulk of the silicon carbide, thus indicating that the silicon carbide fibre was substantially homogeneous across a transverse section of the fibre.

By way of comparison a commercially produced silicon carbide fibre produced by chemical vapour disposition onto a tungsten filament ('Sigma', Sigma Composites Ltd) was similarly mounted in block of acrylic resin, polished, and examined by energy dispersive x-ray analysis. The analysis indicated a region of dimension approximately 12 micron in the centre of the fibre which did not contain silicon carbide and which consisted of tungsten, thus indicating that the fibre was not substantially homogeneous across a transverse section of the fibre.

The change in crystal structure, and specifically the change in crystallite size, of a silicon carbide fibre produced as described in this example when heated to elevated temperature was determined by X-ray examination. Mean crystallite size, L, was determined from the width of a given X-ray peak using the formula $$L = \frac{K\lambda}{B \cos \phi}$$

where $\lambda$ is the wavelength of the radiation used, in this case Cu K$\alpha$, and K is the Scherrer constant. In this case the <111> planes were examined corresponding to a lattice spacing of 2.51 A and $\phi$, the Bragg angle, was 35.74°, and a Scherrer constant K of 1.0 was assumed. B is the full width of the reflection at half height corrected for any instrument broadening using the formula $$B = \beta - \left(\frac{b^2}{\beta}\right)$$

where $\beta$ is the full width at half height obtained from the sample and b is the full width at half height of a standard. The standard used was quartz (Arkansas stone). The peak measured was the 251A peak or that nearest to 251A.

A silicon carbide fibre produced as described in this example was subjected to the X-ray examination described above, both prior to and after heating to 1500° C. in an atmosphere of argon for 10 hours. Both prior to and after heating the apparent size of the crystallites in the silicon carbide fibre was >1000 A indicating that there was no change in the crystalline microstructure of the silicon carbide even after heating to 1500° C.

By way of comparison, a 'Nicalon' silicon carbide fibre and a 'Sigma' silicon carbide fibre as referred to above were subjected to the X-ray examination as described in this example, both prior to and after heating in an atmosphere of argon at 1500° C. for 10 hours. In the case of the 'Nicalon' fibre the apparent crystallite size in the fibre increased on heating from 50 A to 150 A, and in the case of the 'Sigma' fibre the apparent crystallite size increased from 150 A to 400A, indicating crystalline microstructural instability in the fibres on heating.

In order to show that prolonged exposure to elevated temperature of the silicon carbide produced as described in this example has little if any effect on the strength of the fibre samples of fibre were heated at 1500° C. in air for times ranging up to 100 hours. The bending strengths of the fibres were then measured on a 3-point bend test at room temperature, with the following results.

| Time of heating hours | Bending Strength MPa |
|---|---|
| 0 | 1431 |
| 1 | 1665 |
| 10 | 1437 |
| 100 | 1524 |

EXAMPLES 2 to 6

The procedure of Example 1 above was repeated in five separate examples to produce silicon carbide fibres except that the diameter of the orifice of the extruder was, respectively, 100, 150, 200, 50 and 25 microns.

Chemical analysis indicated that the fibres consisted substantially of silicon carbide, and X-ray analysis indicated that the fibres were substantially homogeneous over a transverse section of the fibres.

EXAMPLES 7 to 9

The procedure of Example 1 above was repeated in three separate examples to produce silicon carbide fibres, except that the compositions from which the fibres were produced comprised respectively, 49.5 parts of silicon carbide powder, 3 parts of hydrolysed polyvinyl acetate, 2 parts of glycerol, and 9 parts of water, 49.5 parts of silicon carbide powder, 1 part of hydrolysed poly vinyl acetate, 2 parts of glycerol, and 9 parts of water, and 49.5 parts of silicon carbide powder, 1 part of hydrolysed polyvinyl acetate, 2 parts of glycerol, and 10 parts of water, and the orifice of the extruder had a diameter of 100 microns.

Chemical analysis indicated that the fibres consisted substantially of silicon carbide, and X-ray analysis indicated that the fibres were substantially homogeneous over a transverse section of the fibres.

EXAMPLE 10

The procedure of Example 1 was repeated except that the composition from which the fibres were produced comprised 50 parts of silicon carbide powder containing 0.5% of boron, 10 parts of polyvinyl butyrol, and 12 parts of cyclohexanone, and the composition was extruded through orifices of diameters 300, 100 and 50 microns.

Chemical analysis indicated that the fibres consisted substantially of silicon carbide, and X-ray analysis indicated that the fibres were substantially homogeneous over a transverse section of the fibres.

EXAMPLE 11

The procedure of Example 1 was repeated except that a gel was formed by mixing 20 parts of polyacrylamide having a molecular weight in the range 5 to $6 \times 10^6$ with 80 parts of water and the mixture was allowed to stand for 4 days, the composition from which the fibres were produced comprised 50 parts of silicon carbide containing 0.5 part of boron, and 15 parts of the gel produced as described above, and the composition was extruded through orifices of diameters 300, 100 and 50 microns.

Chemical analysis indicated that the fibres consisted substantially of silicon carbide, and X-ray analysis indicated that the fibres were substantially homogeneous over a transverse section of the fibres.

Fibres of diameter 100 microns which after sintering had a density of 99.8% of the theoretical maximum density were heated in air at 1500° C. for 100 hours. The bending strength of the fibres so heated, determined at room temperature, was 1197 MPa, with a standard deviation of 204 MPa. Fibres which had not been so heated in air had a bending strength of 1314 MPa with a standard deviation of 193 MPa.

EXAMPLE 12

The procedure of Example 1 was repeated except that a gel was formed by mixing 20 parts of hydroxypropyl methyl cellulose and 100 parts of water, and the mixture was allowed to stand for 4 days, the composition from which the fibres were produced comprised 50 parts of silicon carbide containing 0.5% of boron and 20 parts of the gel produced as described above, and the composition was extruded through orifices of diameters 300, 100 and 50 microns.

Chemical analysis indicated that the fibres consisted substantially of silicon carbide, and X-ray analysis indicated that the fibres were substantially homogeneous over a transverse section of the fibres.

EXAMPLE 13

The procedure of Example 1 was repeated except that the silicon carbide which was used was in the form of a powder produced by a plasma process and having a surface area of 23 $m^2 g^{-1}$, the composition comprised 69 parts of silicon carbide, 1 part of boron powder, 3 parts of partially hydrolysed polyvinyl acetate, 4.5 parts of D-glucose (as a source of carbon which is an aid to sintering), 2 parts of glycerol, and 9 parts of water, and the composition was extruded through orifices of diameters 50, 100 and 200 microns. The silicon carbide fibres, after sintering, had a density of 98.4% of the theoretical density.

Chemical analysis indicated that the fibres consisted substantially of silicon carbide, and X-ray analysis indicated that the fibres were substantially homogeneous over a transverse section of the fibres.

Fibres of diameter 100 microns were heated in air at 1500° C. for 100 hours. The bending strength of the fibres so heated, determined at room temperature, was 1139 MPa, with a standard deviation of 143 MPa. Fibres which have not been so heated in air had a bending strength of 1193 MPa with a standard deviation of 188 MPa.

EXAMPLE 14

The procedure of Example 1 was repeated except that the silicon carbide powder which was used comprised 95 weight % β-SiC and 5 weight % α-SiC and had a surface area of 19 $m^2 g^{-1}$, the composition comprised 49 parts of silicon carbide, 1 part of boron, 4.5 parts of partially hydrolysed polyvinyl acetate, 2 parts of glycerol and 10 parts of water, and the composition was extruded through orifices of diameters 100 and 200 mirons.

Chemical analysis indicated that the fibres consisted substantially of silicon carbide, and X-ray analysis indicated that the fibres were substantially homogeneous over a transverse section of the fibres.

EXAMPLE 15

The procedure of Example 1 was repeated except that the silicon carbide which was used consisted of hexagonal silicon carbide having a surface area of 15 $m^2 g^{-1}$, the composition comprised 49 parts of silicon carbide, 1 part of boron powder, 4.5 parts of partially hydrolysed polyvinyl acetate, 4.5 parts of D-glucose (as a source of carbon which is an aid to sintering), 2 parts of glycerol, and 10 parts of water, and the composition was extruded through an orifice of diameter 200 microns.

Chemical analysis indicated that the fibres consisted substantially of silicon carbide, and X-ray analysis indicated that the fibres were substantially homogeneous over a transverse section of the fibres.

The fibres were heated in air at 1500° C. for 100 hours. The bending strength of the fibres so heated, determined at room temperature, was 1656 MPa, with a standard deviation of 191 MPa. Fibres which have not been so heated in air had a bending strength of 1622 MPa with a standard deviation of 224 MPa.

We claim:

1. A silicon carbide fibre in which the silicon carbide constitutes greater than 90% by weight of the fibre and in which the fibre is substantially homogeneous across a transverse section of the fibre.

2. A silicon carbide fibre which comprises a plurality of crystallites and has a mean crystallite size of greater than 500A, as measured by X-ray diffraction.

3. A silicon carbide fibre as claimed in claim 1 or claim 2 in which the silicon carbide constitutes at least 95% by weight of the fibre.

4. A silicon carbide fibre as claimed in any one of claims 1 to 3 in which the density of the fibre is at least 95% of the density of silicon carbide per se.

5. A silicon carbide fibre as claimed in claim 4 in which the density of the fibre is at least 98% of the density of silicon carbide per se.

6. A silicon carbide fibre as claimed in any one of claims 1 to 5 which has a diameter of less than 500 microns.

7. A silicon carbide fibre as claimed in any one of claims 1 to 6 which has a diameter of 1 micron or greater.

8. A silicon carbide fibre as claimed in any one of claims 1 to 7 which has been produced from particles of silicon carbide having a maximum dimension of not greater than 10 microns.

9. A silicon carbide fibre as claimed in claim 8 in which the silicon carbide has been produced by a process which comprises producing an oxygen-containing polymeric product by reacting a first reactant which comprises at least one compound of silicon having two or more groups reactive with hydroxyl groups with a second reactant which comprises at least one organic compound have two or more hydroxyl groups, heating the polymeric product in an inert atmosphere to produce a coked product containing carbon and silica, and heating the coked product to effect a carbothermic reaction between the silica and the carbon, and in which the proportion of the first and second reactants is chosen such that in the coked product the proportion by weight of carbon to the silica is close to the proportion which is theoretically required to produce the silicon carbide.

* * * * *